United States Patent [19]

Emmert et al.

[11] Patent Number: 5,664,973

[45] Date of Patent: Sep. 9, 1997

[54] CONDUCTIVE CONTACT

[75] Inventors: Steven Clark Emmert, Crystal Lake; Louis J. Lundell, Buffalo Grove; Michael Patrick Murray, Chicago; Terrence E. Derdzinski, Fox River Grove, all of Ill.

[73] Assignee: Motorola, Inc., Schaumburg, Ill.

[21] Appl. No.: 369,053

[22] Filed: Jan. 5, 1995

[51] Int. Cl.[6] .................................... H01R 4/18
[52] U.S. Cl. .......................... 439/862; 439/929; 439/82; 320/2
[58] Field of Search ....................... 439/500, 289, 439/78, 700, 824, 80, 929, 862, 853, 506, 660, 82; 320/2

[56] References Cited

U.S. PATENT DOCUMENTS

| | | | |
|---|---|---|---|
| 3,551,750 | 12/1970 | Sterling | 317/101 |
| 4,052,118 | 10/1977 | Scheingold et al. | 339/17 |
| 4,068,915 | 1/1978 | Evans | 339/176 |
| 4,285,562 | 8/1981 | Teagno et al. | 339/33 |
| 4,327,956 | 5/1982 | Sitzler | 339/107 |
| 4,394,059 | 7/1983 | Reynolds | 339/125 |
| 4,416,504 | 11/1983 | Sochor | 339/252 |
| 4,460,237 | 7/1984 | Brown et al. | 339/176 |
| 4,480,386 | 11/1984 | Adams | 29/874 |
| 4,533,187 | 8/1985 | Kirkman | 339/17 |
| 4,553,192 | 11/1985 | Babuka et al. | 361/395 |
| 4,685,886 | 8/1987 | Denlinger et al. | 439/55 |
| 4,698,612 | 10/1987 | Koehler | 337/320 |
| 4,735,585 | 4/1988 | Palmer, III et al. | 439/701 |
| 4,738,625 | 4/1988 | Burton et al. | 439/59 |
| 4,820,182 | 4/1989 | Harwath et al. | 439/290 |
| 4,973,257 | 11/1990 | Lhotak | 439/862 |
| 5,151,643 | 9/1992 | Emmert et al. | 320/2 |
| 5,473,242 | 12/1995 | McKenna | 439/80 |

Primary Examiner—Neil Abrams
Assistant Examiner—Brian J. Biggi
Attorney, Agent, or Firm—John J. King

[57] ABSTRACT

A novel conductive contact comprises a dual beam spring (308, 310) which forms a "C" shaped spring and which is used to electrically mate to a contact on a printed circuit board. The open end of the "C" spring preferably fits over a plastic rib (404) in a housing for support. A surface mount contact (504) on the PCB has formed wings which fit into a rectangular slot in the PCB. To make electrical connection, the board is placed over the "C" spring. The "C" spring and plastic support protrude through the rectangular slot in the PCB. The conductive contact is preferably formed from a single piece of metal.

17 Claims, 6 Drawing Sheets

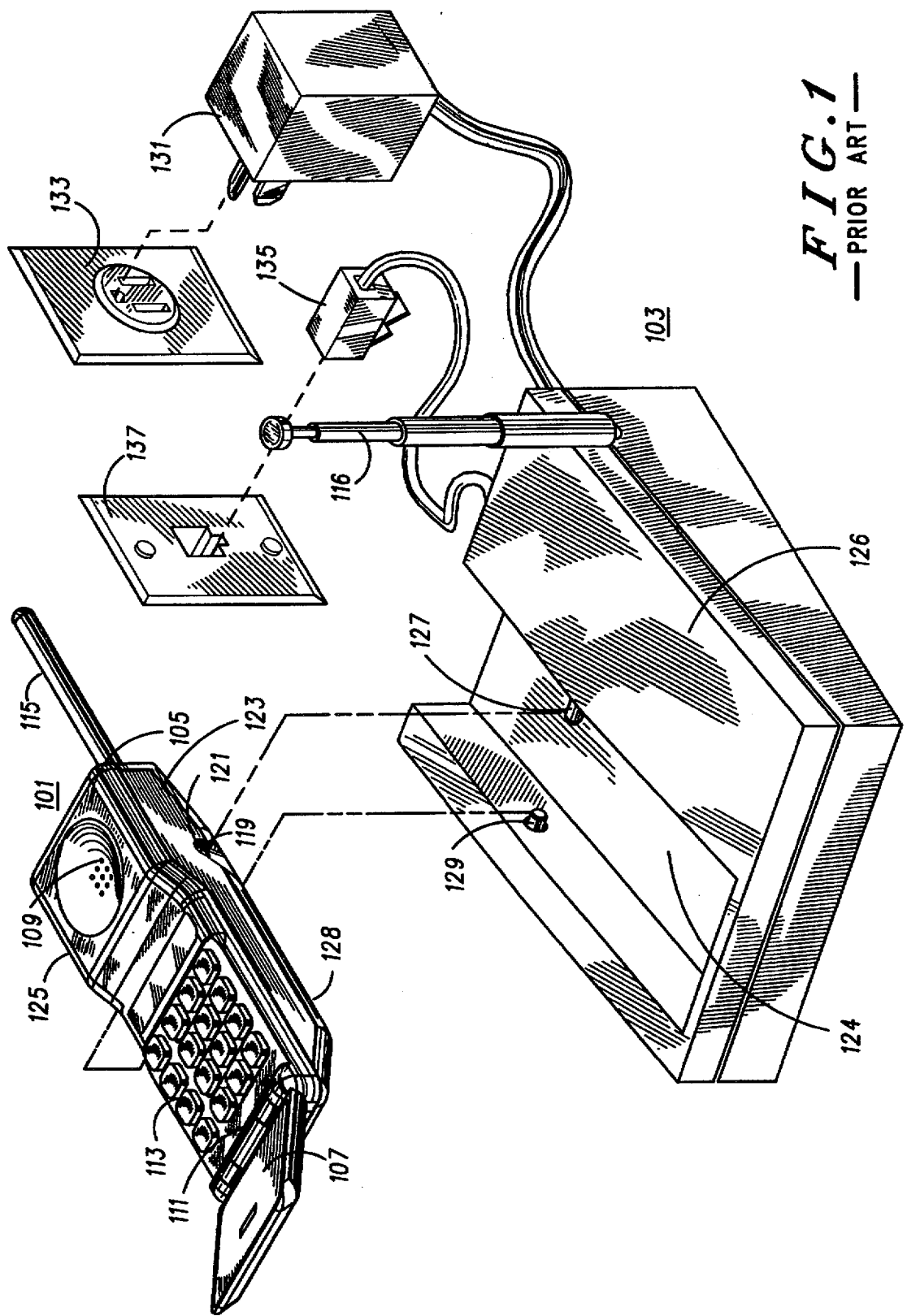
*FIG. 1* — PRIOR ART —

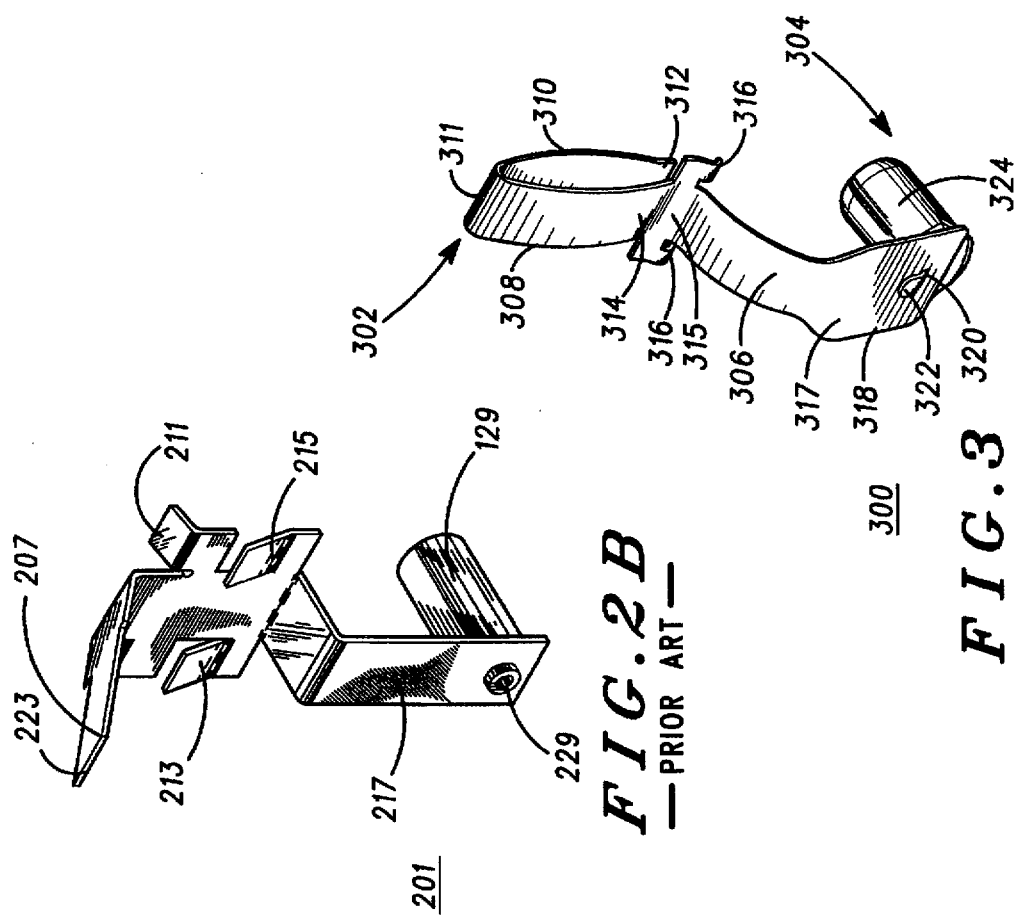
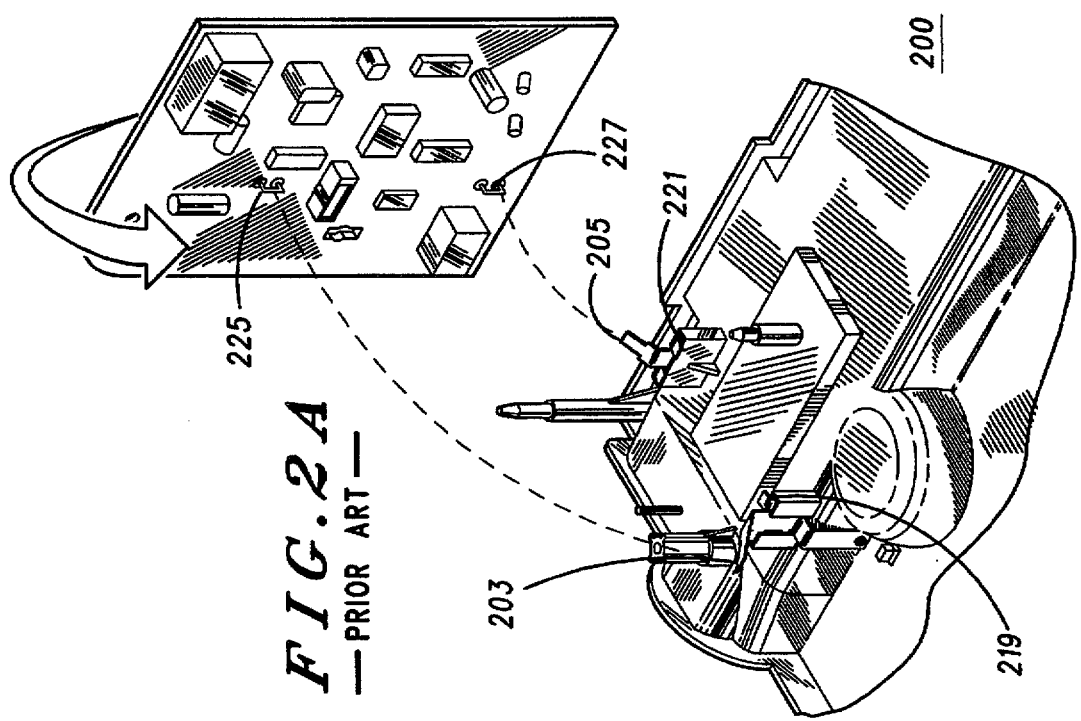

CONDUCTIVE CONTACT

FIELD OF THE INVENTION

The present invention is generally related to conductive contacts, and more particularly to conductive contacts for use in electronic devices.

BACKGROUND OF THE INVENTION

An electronic device often requires conductive contacts for making an electrical connection between two elements. Some conductive contacts may be used to make an electrical connection between a component within one device and a contact pad external to another device. In an wireless electronic device having rechargeable batteries, such as a two-way radio, cellular telephone, cordless telephone, or any wireless communication device, charging contacts are often required on a charging apparatus to provide an electrical current to charge a rechargeable battery of the wireless electronic device.

For example, cordless radiotelephones typically include a base station and an associated handset having a rechargeable battery. The base station comprises of a transformer, an RJ11 phone jack, an antenna, hang-up mechanism and battery charging contacts. The transformer converts 110 V AC power provided by a wall outlet to 12 V DC. The battery charging contacts of the base station interface with corresponding contacts on the handset allowing the handset battery to be recharged.

Spring contact designs are commonly used for charging contacts, as well as other contacts such as antenna contacts in base stations. Conventional spring contacts often transmit a spring load perpendicular to a printed circuit board (PCB) in the base station, resulting in a spring load in the final assembly of the base station. Such a spring load requires additional, costly components such as screws to secure the housings. Also, conventional spring contacts may be susceptible to damage during shipping and handling. Finally, conventional contacts comprise multiple pieces that are riveted together and may be prone to problems of rivet strength, consistency and durability.

Accordingly, there is a need for durable conductive contacts which minimize spring loading of the housing.

BRIEF DESCRIPTION OF THE DRAWINGS

FIG. 1 is an isometric drawing of a conventional wireless communication system including a base station and a handset having a rechargeable battery;

FIG. 2-1 is an isometric drawing of a portion of the inside of the base station of FIG. 1;

FIG. 2-2 is an isometric drawing of a conventional conductive contact attached to the portion of the base station of FIG. 2a.

FIG. 3 is an isometric drawing of a conductive contact according to the present invention;

DESCRIPTION OF THE PREFERRED EMBODIMENT

Figure 4:
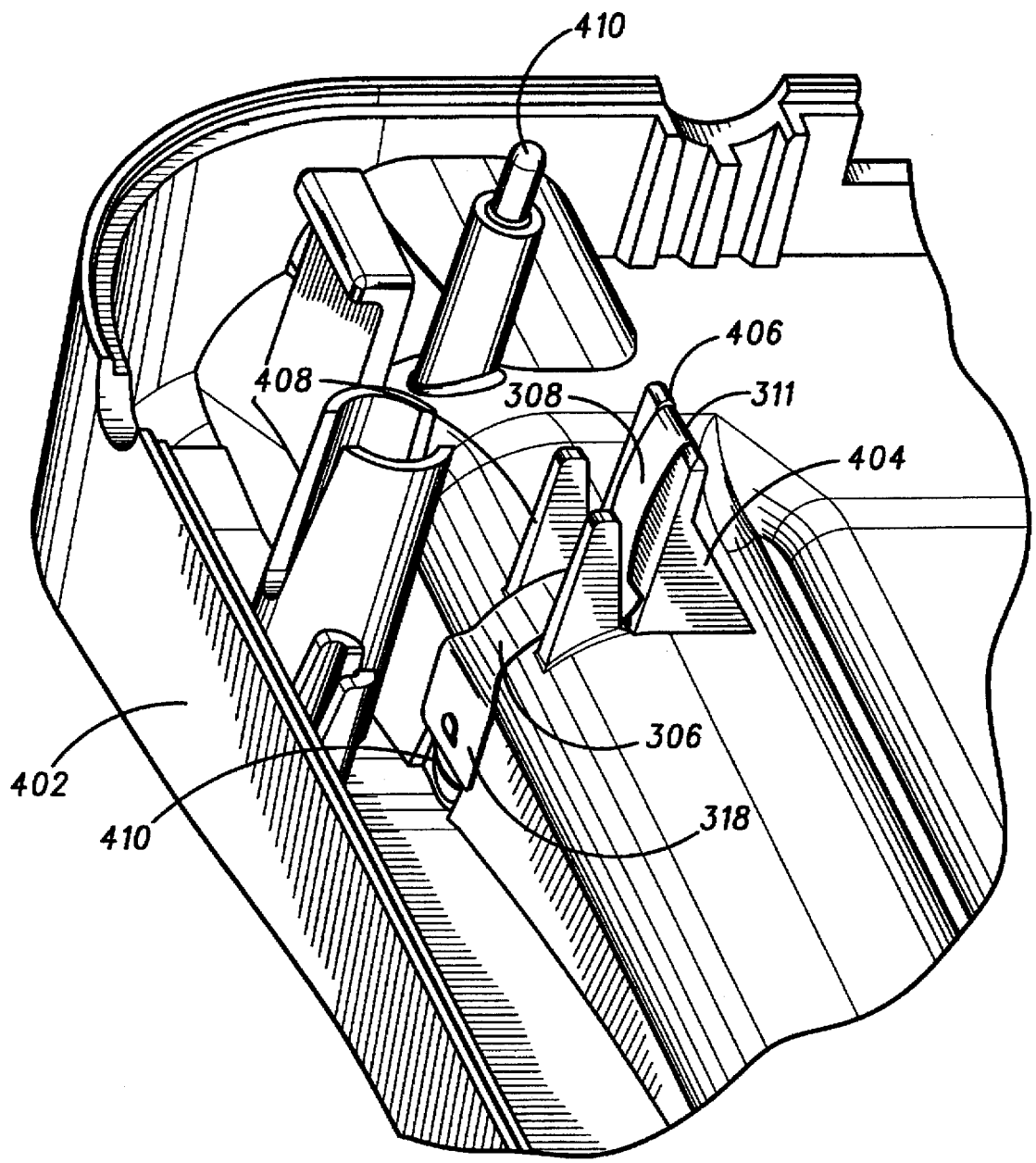
FIG. 4 is an perspective view of the conductive contact of FIG. 3 positioned within a base station housing according to the present invention.

A novel conductive contact includes one portion which is used to electrically mate the contact to the PCB circuitry and consists of two "beam spring" sections which form a "C" shaped spring. The open end of the "C" spring fits over a rib in the plastic for support. This "C" spring uses a thru-board approach to mate to the PCB. A surface mount contact on the PCB has formed wings which fit into a rectangular slot in the PCB. To make electrical connection, the board is placed over the "C" spring which is supported in the plastic. The "C" spring and plastic support protrude through the rectangular slot in the PCB.

Referring to FIG. 1, as disclosed in Emmert et al. U.S. Pat. No. 5,151,643, a cordless radiotelephone system comprising a hand-set 101 and a base station 103 is shown. Handset 101 consists of two external portions, a body portion 105 and a cover element 107. The drawing of FIG. 1 shows the cover element 107 in an "open" position such that the user of the handset may listen via an earpiece 109 and may speak into a microphone 111. A keypad 113 comprises conventional keys and also has additional function buttons such as channel select and volume control buttons. RF communication is provided between the base station antenna 116 and the handset antenna 115.

Since handset 101 of FIG. 1 is portable, electrical energy must be provided to power the electrical functions of the handset. A rechargeable battery (not shown) recessed in the back side of the body portion 105. A battery charging contact 119 is disposed within a triangular recess 121 on side 123 of the body portion 105 of the handset 101. A similar battery charging contact 120 is disposed within a similar triangular recess 122 on side 125 in a location essentially parallel and opposite to the battery charging contact and recess on side 123. Each battery charging contact 119 and 120 provides a conductive electrical connection to the rechargeable battery within the handset 101. In the preferred embodiment, the battery charging contacts are made of nickel plated beryllium copper.

When handset 101 is stored in an indentation 124 in an external surface 126 of base station 103, battery charging posts 127 and 129 are disposed within the triangular recesses on the handset 121 and 122, respectively, thereby creating an electrical connection to the battery charging contacts on the handset 119 and 120, respectively. The battery charging posts 127 and 129 are spring loaded enabling them to retract away from each other when the handset is positioned on the base station 103 and protrude forward when the handset 101 is removed from the base station. Preferably, the battery charging posts are 53.2 mm apart between the tips of the posts and the width between the surface of the battery charging contacts on the handset are 55.1 mm apart. Thus, when the handset is stored in the base station, the battery charging posts are displaced 1.9 mm away from each other. The displacement results in an axial spring force of about 100 grams per battery charging post.

Turning now to FIG. 2-1, a portion of the inside of the base station 103 is shown. A detailed isometric view of a conductive contact positioning the battery charging posts is shown in FIG. 2-2. The conventional mechanism illustrated couples an electrical charge from PCB 201 to the battery charging post 127 and 129 via conductive contacts 203 and 205, respectively. Each conductive contact 203 and 205 is stamped and formed from a sheet of stainless steel 0.3 mm thick. The stamping and forming process creates a pliable portion 207, two tabs 211 (second tab not shown), two barbs 213 and 215 and a spring portion 217. Each conductive contact 203 and 205 is inserted into slots 219 and 221, respectively, which are molded into the base station's housing. The conductive contacts 203 and 205 are secured within the slot using barbs 213 and 215. Two tabs 211 interface with the top of the slot when the conductive contacts are properly located. The pliable portion 207 of each conductive contact includes a straight edge 223 which contacts a conductive staple 225 or 227 on the pcb 201. The conductive staples 225 and 227 are soldered to the pcb 201 using a conventional waveline soldering process. The conductive contacts also include a spring portion 217 connected to the battery charging post 129 using a rivet 229.

Once the conductive contacts 203 and 205 are secured within the slots 219 and 221, respectively, in the base station's housing 200, the battery charging posts 127 and 129 are free to retract away from each other using the spring portion 217. The battery charging posts 127 and 129 are disposed within the indentation 124 essentially opposite each other along essentially the same axis. Thus, an effective electrical connection with the charging contacts on the handset 101 is achieved.

The pcb 201 is secured to the housing 200 using pressure from a second base station housing portion (not shown) such that the pliable portion 207 of the formed conductive contacts 203 and 205 deflect when they contact the conductive staples 225 and 227 thereby creating a reliable electrical connection. Current limiting resistors (not shown) soldered to the pcb 201 comprise a typical battery charging circuit which provides a 12 V DC open circuit, constant current source to the conductive staples 225 and 227 coupled to the battery charging posts 129 and 127, respectively, via conductive contacts 203 and 205.

Turning now to FIG. 3, a charging contact 300 according to the present invention is shown. Charging contact 300 includes a base contact portion 302 and a charging post portion 304 which are generally connected by a spring portion 306. Base contact portion 302 comprises two beam spring sections 308 and 310 which are preferably mirror images of one another to form a C-shaped section having a vertex 311. Beam spring 310 has a distal end 312 which is adapted to couple the contact to a housing or some other portion of a base. Beam spring 308 also includes a distal end portion 314 which is coupled to a base portion 315.

In order to constrain the spring travel of the bullet nose portion of the spring contact, two tabs 316 protrude from the sides of base portion 315. These tabs are retained by ribs in the housing thus defining a fulcrum for spring portion 306 of the charging contact. The fulcrum allows the spring to act as a cantilever spring. Tabs 316 could be adapted to fit into aperture or score in the housing, or could merely provide friction to secure contact 300 to the housing. A distal end 317 of spring 306 is coupled to a receiving surface 318 having an aperture 320 adapted to receive a flange 322 of charging post 324. The charging contact is preferably formed from a single sheet of metal or some other conductive material.

Turning now to FIG. 4, one application for conductive contact 300 of FIG. 3 is shown. Conductive contact 300 is generally attached to a housing 402. In particular, conductive contact 300 fits over a support member 404. Support member 404 preferably includes a recess 406 for receiving vertex 311 of the base contact portion 302. As can be seen in more clearly in FIG. 6, battery charging post 324 extends through an aperture 410 in the base housing.

Figure 5:
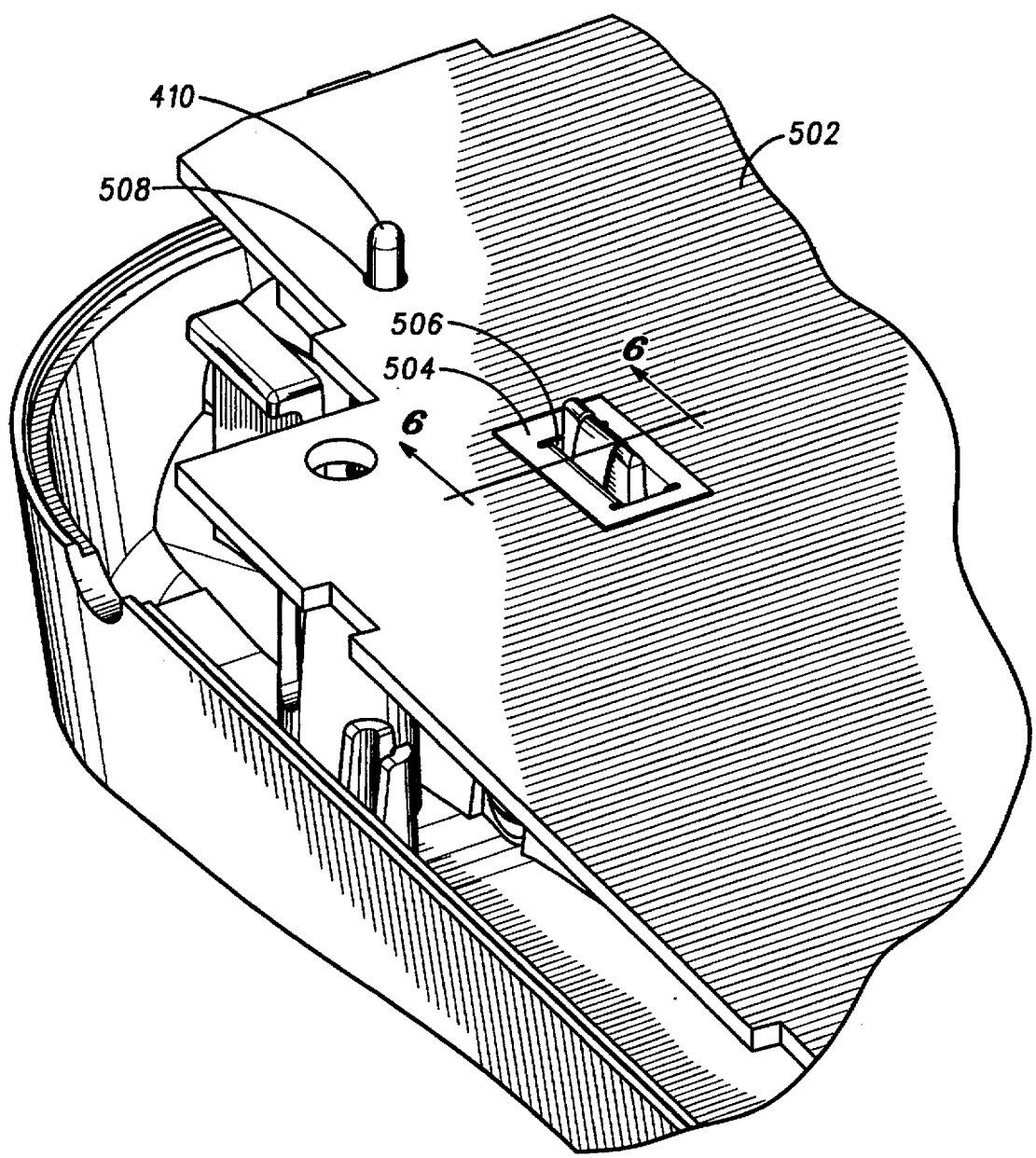
FIG. 5 is a perspective view of a PCB coupled to the conductive contact positioned within the base station housing of FIG. 4.

Turning now to FIG. 5, the novel coupling of conductive contact 300 to a PCB 502 using a thru-board approach to mate to the PCB is shown. PCB 502 is generally an insulator material having conductive traces printed on or within the insulator, and includes a surface mount contact 504 which extends through an aperture 506 in PC Board 502. The surface mount contact has formed wings which fit into a rectangular slot in the PCB. To make electrical connection, the PCB is placed over base contact portion. The base contact portion and support member 404 protrude through aperture 506 in the PCB. PC Board 502 may also include other apertures, such as aperture 508 to receive alignment post 410.

Figure 6:
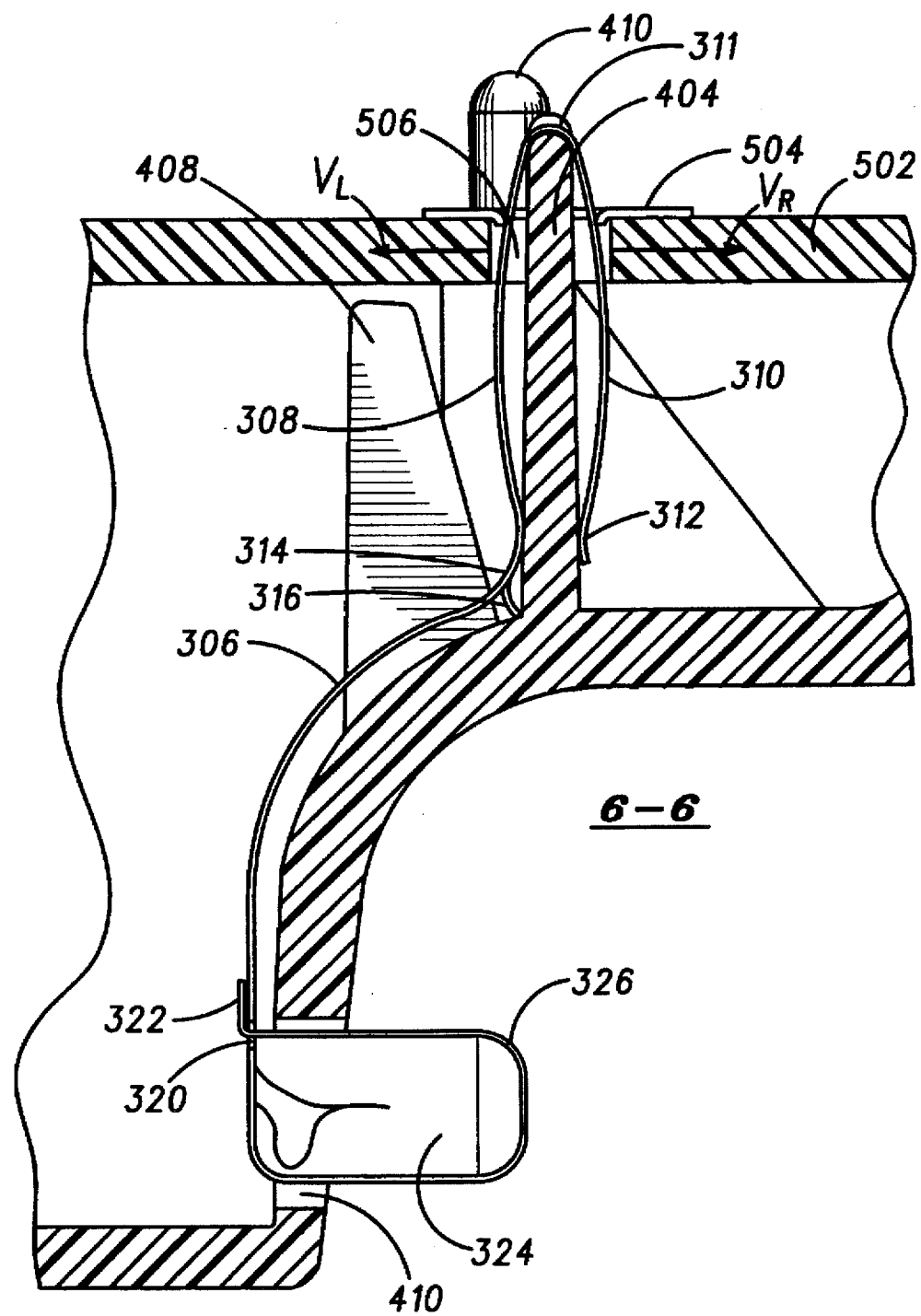
FIG. 6 is a cross-sectional view of the base station housing, conductive contact, and PCB taken at lines A—A of FIG. 5.

Turning now to FIG. 6, a cross sectional view of PCB 502 attached to the conductive contact positioned on the base is shown. In particular, conductive contact 300 extends over support member 404. Distal end 312 of beam spring 310 and distal end 314 attach contact 300 to support member 404. Tab 316 also provides attachment to support member 404. Charging post 324 is also shown extending through aperture 410 in the base. Spring member 306 allows the charging post to move laterally within aperture 410.

One novel feature of the invention can be seen in the force vectors V1 and Vr applied by beam springs 308 and 310, respectively, as shown in FIG. 6. The contact arrangement according to the present invention transmits its spring load in a transverse direction to the PCB. While contact element 504 is shown on the bottom surface of the PCB, the contact could be positioned on the top surface of the PCB or could extend fully through the PC Board. Also, while a charging post portion is shown, the distal end of the charging post portion could be coupled to a contact pad within the charging apparatus and is coupled to an external charging contact.

Figure 7:
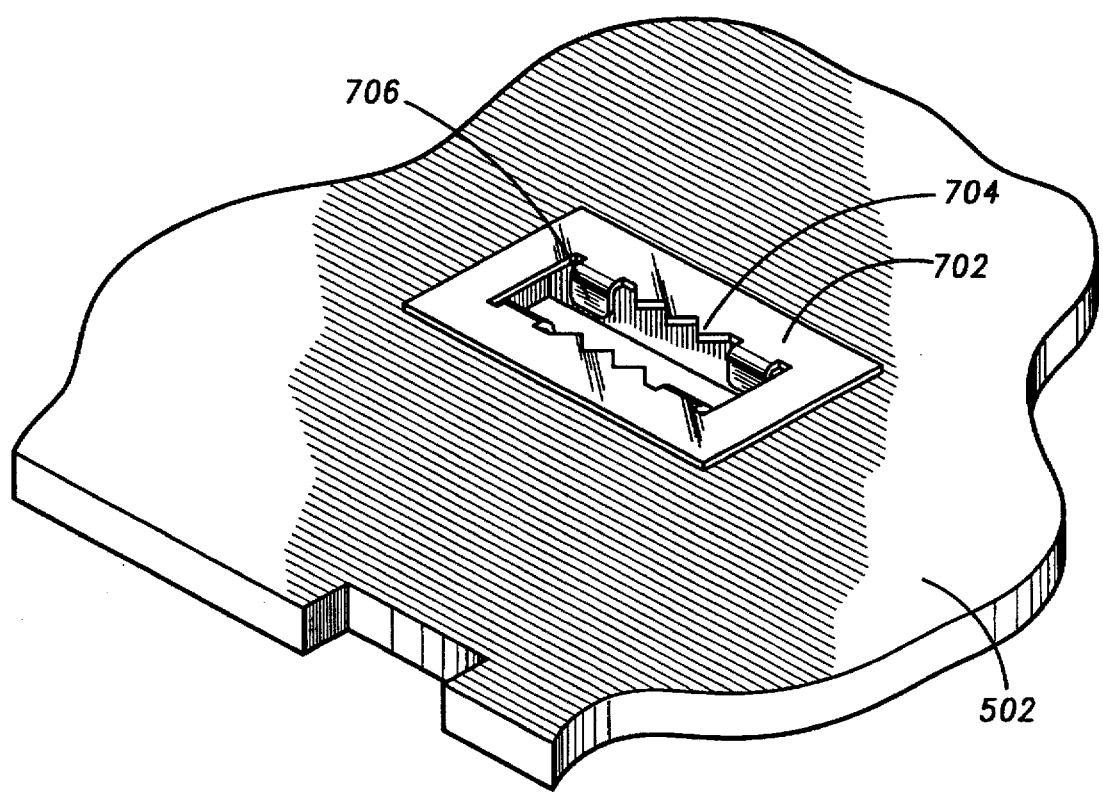
FIG. 7 is a perspective view of an alternate embodiment of a surface mount contact positioned within the PCB.

Turning now to FIG. 7, an alternate embodiment of the surface mount contact 702 is shown. The surface mount contact has teeth 704 to ensure a good contact with base contact portion 302. The surface mount contact also preferably includes alignment tabs 706 for aligning the contact within the aperture.

In summary, the thru-board design of the present invention resolves common problems associated with spring contacts by providing a load which parallel to the plane of the PCB. Also the charging posts formed of a single sheet of metal provides an electrical contact having good mechanical support. The single piece contact uses a formed tip and fold over tab to provide a contact which is less costly, more reliable, and strong. Commonly such parts consist of two components riveted together which is more costly and prone to durability problems. Also, the conductive contact is completely supported by plastic in the housing which minimizes damage during handling.

While the specific implementations of the present invention are described above, variations and modifications could be made by one skilled in the art within the spirit and scope of the present invention. For example, the dual beam portion of the contact could comprise a single beam spring. Aslo, the battery charging post could merely be a conventional charging contact positioned within the charging apparatus and coupled to an external charging post or pad. The present invention should be limited only by the appended claims.

We claim:

1. A single piece conductive contact comprising:

a contact having a first convex beam spring and a second convex beam spring opposing said first convex beam spring, said first convex beam spring and said second convex beam spring being coupled to form a vertex;

a spring portion having a fulcrum at an end of said second beam spring; and a charging post positioned at an end of said spring portion.

2. The conductive contact of claim 1 wherein said first convex beam spring and said second convex beam are substantially the same.

3. The conductive contact of claim 1 wherein said spring portion is a cantilever spring.

4. The conductive contact of claim 1 wherein said fulcrum comprises at least one tab member.

5. The conductive contact of claim 1 wherein said charging post comprises a battery charging contact.

6. The conductive contact of claim 5 wherein said charging post comprises a flange extending through an aperture in said spring portion.

7. The conductive contact of claim 6 wherein said charging post includes a preformed flange and wherein said spring portion having an aperture adapted to receive said flange.

8. A single piece, conductive contact comprising:
   a contact comprising a first convex beam spring and a second convex beam spring opposing said first convex beam spring, said first convex beam spring and said second convex beam spring being coupled to form a vertex;
   a fulcrum formed at an end of said second convex beam spring;
   a cantilever spring coupled to said fulcrum; and
   a movable contact positioned at an end of said cantilever spring.

9. A battery charging contact adapted to couple battery charging power from a charging apparatus to a portable device, said battery charging contact comprising:
   a contact comprising a first beam spring and a second beam spring coupled at a vertex, said contact being adapted to be inserted in an aperture in a printed circuit board of said charging apparatus;
   a cantilever spring having a fulcrum at an end of said second beam spring; and
   a charging contact positioned at an end of said cantilever spring, said charging contact being adapted to move relative to an aperture in a housing of said charging apparatus.

10. A conductive contact arrangement comprising:
    an insulator material having an aperture and a contact positioned at least partially within said aperture;
    a contact comprising a first beam spring and a second beam spring coupled at a vertex, wherein at least a portion of said vertex extends through said aperture and said first beam spring and second beam spring make an electrical connection to said contact;
    a support member extending between said first beam spring and said second beam spring to said vertex; and
    a charging contact coupled to a distal end of said second beam spring.

11. The conductive contact arrangement of claim 10 wherein said insulator material is a printed circuit board.

12. The conductive contact arrangement of claim 10 wherein said support member is an insulator material.

13. The conductive contact arrangement of claim 10 wherein said support member is at least a portion of a base station housing.

14. The conductive contact arrangement of claim 10 further comprising a spring having a fulcrum at said distal end of said second beam spring, wherein said second beam spring is coupled to said spring element.

15. The conductive contact arrangement of claim 14 wherein said spring is a cantilever spring.

16. The conductive contact arrangement of claim 10 wherein said contact and said charging contact are formed of a single piece of metal.

17. A conductive contact arrangement comprising:
    a printed circuit board having an aperture and a contact positioned at least partially within said aperture;
    a contact comprising a first beam spring and a second beam spring coupled at a vertex, wherein at least a portion of said vertex extends through said aperture and said first beam spring and second beam spring make a connection to said contact;
    a portion of a housing extending between said first beam spring and said second beam spring to said vertex; and
    a charging contact coupled to a distal end of said second beam spring and extending through an aperture in said housing.

* * * * *